United States Patent [19]
Beeteson et al.

[11] Patent Number: 5,932,498
[45] Date of Patent: Aug. 3, 1999

[54] MAGNET AND METHOD FOR MANUFACTURING A MAGNET

[75] Inventors: John Beeteson, Skelmorlie; Andrew Knox, Kilbirnie; Christopher Carlo Pietrzak, Gourock, all of United Kingdom

[73] Assignee: International Business Machines Corporation, Armonk, N.Y.

[21] Appl. No.: 08/823,669

[22] Filed: Mar. 24, 1997

[30] Foreign Application Priority Data

Jul. 12, 1996 [GB] United Kingdom .................... 9614682

[51] Int. Cl.⁶ .............................. C03C 4/04; C03C 14/00
[52] U.S. Cl. ............................ 501/13; 501/32; 252/62.6; 252/62.62; 252/62.59; 252/62.61
[58] Field of Search ................ 501/13, 32; 252/62.51 R, 252/62.62, 62.59, 62.61, 62.58, 62.6

[56] References Cited

U.S. PATENT DOCUMENTS

| | | | |
|---|---|---|---|
| 2,684,911 | 7/1954 | Stookey | 501/13 |
| 2,971,853 | 2/1961 | Stookey | 501/13 |
| 3,900,415 | 8/1975 | Lee et al. | 252/62.59 |
| 4,480,044 | 10/1984 | McAlinn | 501/4 |
| 5,212,120 | 5/1993 | Araujo | 501/13 |

FOREIGN PATENT DOCUMENTS 62-124622  6/1987  Japan .
1 524 124  9/1978  United Kingdom .

OTHER PUBLICATIONS

Derwent Abstract 90–278915/37 & JP 020196048A Itochu Shoji abstracts for JP 2–196048, Aug. 2, 1990.

Ceramic Composites by the Sol–Gel Method: A Review, Azar Nazeri Ceram. Eng. Sci. Proc. 14(11–12) pp. 1–19 (1993).

Sol–gel processing: A versatile concept for special glasses and ceramics, D Ganguli Bull. Mater. Sci., vol. 16, No. 6. Dec. 1993, pp. 523–531.

Photo Chemically Machinable Glass Ceramics, Takashi Matsuura Practical Surface Technologies No. 11, 1988.

Sintering of Lithium Zinc Ferrites with Alkoxide–Derived Borosilicate Liquid Phase, Keith G Brooks, J. Am. Ceram. Soc., 74(10) 2513–17 (1991).

Effect of glass addition and quenching on the relation between inductance and external compressive stress in Ni–Cu–Zn ferrite–glass composites, T Yamaguchi Journal of Materials Science 30 (1995) 504–508.

*Primary Examiner*—C. Melissa Koslow
*Attorney, Agent, or Firm*—Thomas A. Beck

[57] ABSTRACT

A chemically-machinable glass-magnet composition comprising a photosensitive chemically machinable glass having a magnetic material in admit therewith, wherein the photosensitive chemically machinable glass is formed of $SiO_2$—$Li_2O$—$Al_2O_3$ containing photosensitive materials selected from silver, gold and copper and a cerium dioxide sensitizer; and the magnetic material is a Ni-Cu-Zn ferrite.

3 Claims, No Drawings

MAGNET AND METHOD FOR MANUFACTURING A MAGNET

TECHNICAL FIELD

The present invention relates to a magnet, a method of manufacturing, and intermediate products for use in the manufacture of a magnet, in particular magnets, including ferrites, with complex shapes or perforations.

BACKGROUND OF THE INVENTION

Ferrite-glass composites have been used to form ferrite cores, rods and toroids, see for example T Yamaguchi et al., Journal of Materials Science 30 (1995) pages 504 to 508 and references therein. K G Brooks et al., Journal of the American Ceramic Society 74 (1991) pages 2513 to 2517 describe a sol-gel technique for producing a lithium zinc ferrite-glass composite. The preparation methods for the ferrite-glass composites have the disadvantage that, during the sintering phase, the risk of shrinkage and cracking at points of stress is high and may lead to a correspondingly high reject rate when preparing magnets with complex shapes or perforations.

T Matsuura, Practical Surface Technologies No 11 (1988) pages 552 to 558 describes photochemically machinable glass ceramics.

SUMMARY OF THE INVENTION

Accordingly the present invention provides a magnet-photosensitive glass composite.

The present invention further provides a photochemically machinable magnet-glass composite and its use in a method of manufacturing a magnet having complex shape or perforations; said method avoiding a high temperature sintering process during the step of formation of the complex shape or perforations.

The magnetic material in the composite may be a permanent magnet or a ferrite. Suitable permanent magnet materials include neodymium-iron-boron. Suitable non-permanent magnet ferrites for use in the composite include Ni-Cu-Zn ferrite. Other suitable ferrites include permanent magnet ferrites such as iron oxide mixed with oxides of barium and/or strontium.

The magnetic material in the composite may be suitably orientated at any time after forming, but preferably after the final shaping. The material is orientated by heating above the Curie point in a suitably aligned magnetic field.

Suitable photosensitive glass for use in the composite will be capable of chemical machining of three dimensional cavities within the glass by photoetching. A suitable glass is a $SiO_2$—$Li_2O$—$Al_2O_3$ glass containing at least one photosensitive metal and sensitiser. Suitable photosensitive metals include silver, gold and copper. A suitable sensitiser is cerium dioxide.

Suitably the amount of magnetic material in the composite is from trace amounts to about 98 percent by weight. Preferably the ratio of magnetic material to photosensitive glass in the composite is from 10:90 to 50:50 by weight. Preferably the ratio is in the range 10:90 to 20:80 by weight.

The magnet-photosensitive glass composite is suitably manufactured by conventional processes such as those used for the manufacture of ferrite-glass composites in which the conventional glass is replaced by photosensitive glass; for suitable manufacturing processes see the Yamaguchi and Brooks references hereinbefore.

Preferably the magnet-photosensitive glass will be formed as glass sheets, with a particularly preferred thickness being 1 to 5 mm, with 2 mm being most preferred.

In a further embodiment of the present invention there is provided a method of manufacturing a shaped magnet-glass composite, comprising the steps of:

a) irradiating those portions of the magnet-photosensitive glass composite to be removed;
b) developing the irradiated composite; and
c) chemically removing the developed composite.

The step of irradiating those portions of the composite to be removed is suitable accomplished by use of a suitable mask which is impermeable to the radiation but is readily formed into the two dimensional shape required. Mask materials such as those used in the manufacture of printed circuits and integrated circuits may be used in the present process. Examples of suitable mask materials include polyimides. The mask may be removed following the irradiation step or may be left in place until after the chemical removal step; the mask material should preferably be unreactive to the development and chemical removal steps if it is to be left in place. Examples of masks which can be left in place include chromium as a mask for UV light, and metal masks in general for use as a mask for X-rays.

The $SiO_2$—$Li_2O$—$Al_2O_3$ glass containing photosensitive metal and sensitiser as described above is suitably irradiated with ultraviolet radiation and is thereafter developed by heat-treatment. The length of time for the irradiation step and the length of time for and the temperature of the heat-treatment may be found by trial and error but must be of sufficient time to ensure crystallisation of the irradiated composite, but not such as to cause crystallisation of those portions shielded from the radiation by the mask.

Suitable radiation times are determined by trial and error and are dependent on composite thickness and irradiation source strength. Preferably radiation source strength and thickness of material would be chosen to give irradiation times in the 3 to 20 minutes region.

Suitable times for heat-treatment are selected as for radiation times, with heat treatment at temperatures in the range 500 to 600 degrees centigrade being the range of choice.

The developed magnet-glass composite is chemically removed by exploiting the differences in chemical reactivity between the developed and undeveloped portions of the composite. The developed portions of the $SiO_2$—$Li_2O$—$Al_2O_3$ glass described above may suitably be removed by dissolving the developed, crystalline, composite with aqueous hydrogen fluoride solution. Suitable concentrations, temperatures and etch times may be determined by trial and error but are suitably selected to ensure that only developed composite is removed. Preferably the etching process is carried out at about room temperature with dilute aqueous hydrogen fluoride solution; suitable concentrations being between 2 and 10% by weight, with 5% being particularly apt.

The manufacturing process of the present invention is particularly suitable for the manufacture of the perforated permanent magnets of the type for use in magnetic matrix electron sources and display devices incorporating such an electron source as described in copending UK patent application 9517465.2 filed Aug. 25, 1995, the content of which is incorporated herein by reference. In particular there is described a magnet perforated by a two dimension matrix of perforations or "pixel wells"; such a magnet is particularly suitable for manufacture from the materials and by the method described herein.

DETAILED DESCRIPTION OF THE PREFERRED EMBODIMENT

The following example illustrates the preparation of a magnet-photosensitive glass composite of the present invention:

Gel Precursor

A mixture is made of the alkoxides of silicon (tetraethoxysilane) and aluminium (aluminium triethoxide) in an ethanolic solution. The concentration of material should be greater than 3% by weight. The proportions are those required for the final glass composition. To this mixture is added a complexed lithium salt dissolved in ethanol to the required glass mol fraction. The complexed salt is sterically inhibited towards hydration (4Crown12 complex). To this is added a colloidal dispersion of the photosensitizing metal (silver, gold or copper) in an ethanolic solution. To this is further added a chelated salt of cerium (III) in ethanol. The chelate is chosen so as to be stable under the basic ethanolic conditions. The mol fractions of the sensitising and photoactive components is variable and can be optimised for appropriate photoactivity. Ethanol can be replaced by any polar non-aqueous solvent that does not cause unwanted nucleophilic attack on the silane or aluminium alkoxide. Similarly the ethoxide can be replaced by any alkoxide.

Ferrite Precursor

A suspension of ferrite particles in ethanolic (or other non-aqueous carrier as above) is prepared. This suspension may be stabilised by the addition of a stabiliser such as, for example, polyethylene oxide or polyethylene alcohol. To this is added a variable quantity of water and an acid such as, for example, nitric acid or acetic acid; the function of the acid is to catalyse the hydration of the alkoxides. The acid is chosen so that it will not rapidly hydrolyse the lithium or cerium complexes, the acid may be left out in some formulations. The acid is additionally chosen such that it will break down under the initial baking conditions leaving no solid residue.

Gel Formation

The gel precursor and ferrite precursor are added together with stirring. Stirring is continued while slow controlled hydrolysis takes place. The stirring is continued until the viscosity of the mixture has increased to a value at which the ferrite is maintained in suspension without additional stirring.

Moulding

The partially gelled ferrite composition is poured into a suitable mould to provide the sheet format.

Gel Completion

The gel continues to form in the mould, resulting in a semi-rigid gel. Further gel layers can be incorporated at this stage by repeating all or some of the previous steps with or without modifications.

Gel Ageing

In order to permit a stable cross-linked structure to form the gel may require ageing for a period of time; this is determined so as to create a structure which on drying will have the correct mechanical stability.

First Stage Drying

The gel is dried under controlled conditions to remove the bulk of the carrier solvent. The rate and conditions are controlled so as to reduce the time required while preventing stresses resulting from the volume changes which will take place, causing fracturing of the material. The material should at this stage show a moderate level of dimensional stability.

Second Stage Drying

The residual solvent held within the pore structure of the gel is removed; the conditions would be similar to stage one but the rate of drying will decrease as a function of the residual solvent remaining. The appearance of the gel may change but there should be minimal volume change.

Final Drying

To remove solvent which is physi- or hydrogen-bonded within the pores of the gel, the stabilised gel is heated to a moderate temperature of circa 200 degrees Centigrade.

Cerium Oxidation

The cerium is oxidised to the Ce+IV oxidation state by heating the gel in an oxygen rich atmosphere. The temperature is controlled such that the oxidation takes place without chemical destruction of the ferrite.

Densification

The porous gel is now heated to a higher temperature under a controlled atmosphere. The atmosphere is controlled to maintain the required oxidation states of the composite constituents. The atmosphere may be replaced with an inert easily flushed gas such as helium during the final stages of densification. The densified structure is cooled to room temperature before further processing.

We claim:

1. A chemically-machinable glass-magnet composition comprising a photosensitive chemically machinable glass having a magnetic material in admixture therewith; wherein:
    said photosensitive chemically machinable glass is formed of $SiO_2$—$Li_2O$—$Al_2O_3$ containing photosensitive materials selected from silver, gold and copper and a cerium dioxide sensitizer; and wherein
    said magnetic material is a Ni-Cu-Zn ferrite.

2. The chemically-machinable glass-magnet composition as claimed in claim 1 wherein the ratio of ferrite to photosensitive glass in the composite is from 10:90 to 50:50 by weight.

3. The chemically-machinable glass-magnet composition as claimed in claim 1 formed as a glass sheet with a thickness of 1 to 5 mm.

* * * * *